United States Patent
Wink (10) Patent No.: US 11,498,469 B2
(45) Date of Patent: Nov. 15, 2022

(54) TIP OVER PREVENTION FOR DUMPING VEHICLES

(71) Applicant: WINK ANTI TIP, LLC, Evansville, IN (US)

(72) Inventor: James W Wink, Evansville, IN (US)

(73) Assignee: Antitip, LLC

( * ) Notice: Subject to any disclaimer, the term of this patent is extended or adjusted under 35 U.S.C. 154(b) by 388 days.

(21) Appl. No.: 16/731,384

(22) Filed: Dec. 31, 2019

(65) Prior Publication Data

US 2020/0207249 A1    Jul. 2, 2020

Related U.S. Application Data

(60) Provisional application No. 62/786,990, filed on Dec. 31, 2018.

(51) Int. Cl.
  *B60P 1/04*    (2006.01)
  *B60R 16/023*  (2006.01)
  *B60P 1/16*    (2006.01)
  *B60P 1/267*   (2006.01)

(52) U.S. Cl.
  CPC ............... *B60P 1/045* (2013.01); *B60P 1/16* (2013.01); *B60P 1/267* (2013.01); *B60R 16/0233* (2013.01)

(58) Field of Classification Search
  CPC .. B60P 1/045; B60P 1/16; B60P 1/162; B60P 1/267; B60R 16/0233
  See application file for complete search history.

(56) References Cited

U.S. PATENT DOCUMENTS

| 4,079,959 A | 3/1978 | Vance |
| 4,145,682 A | 3/1979 | Cook |
| 4,261,616 A * | 4/1981 | Beegle ............... B60P 1/045 91/392 |
| 4,442,915 A * | 4/1984 | Steel ............... B60P 1/162 298/17 R |

(Continued)

FOREIGN PATENT DOCUMENTS

| DE | 102013202415 A1 * | 8/2014 | .......... B60G 17/017 |
| EP | 3064398 A1 * | 9/2016 | ............. B60P 1/045 |

(Continued)

OTHER PUBLICATIONS

PCT International Searching Authority, International Search Report and Written Opinion of the ISA for Application PCT/US19/69004, the PCT Corespondent of the Instant Application dated May 5, 2020.

(Continued)

*Primary Examiner* — James Keenan
(74) *Attorney, Agent, or Firm* — Indiano Law Group, LLC; E. Victor Indiano; John T. Woods (57) ABSTRACT

A tip-over prevention system for dumping vehicles includes a tilt detector operably coupled to one of a cargo body and a chassis of a dumping vehicle. At least a portion of the cargo body is configured to be raised by a piston, and the tilt detector is configured to detect a current tilt. The system includes a fluid release valve placed in fluid communication with the piston which is activated in response to the tilt detector detecting a current tilt that exceeds a preset tilt limit. Activation of the fluid release valve releases a pressure in the piston causing the cargo body of the vehicle to lower.

15 Claims, 6 Drawing Sheets

(56) References Cited

U.S. PATENT DOCUMENTS

| | | | |
|---|---|---|---|
| 4,568,028 A | | 2/1986 | Verseef et al. |
| 4,573,742 A | | 3/1986 | Tegtmeier |
| 4,658,508 A | | 4/1987 | Oberg |
| 4,705,295 A | | 11/1987 | Fought |
| 4,988,974 A | * | 1/1991 | Fury ................. B60P 1/045 340/673 |
| 5,742,228 A | | 4/1998 | Levy |
| 5,816,766 A | | 10/1998 | Clark |
| 5,971,493 A | | 10/1999 | Robert |
| 5,997,013 A | | 12/1999 | Claxton |
| 6,027,173 A | | 2/2000 | Bettini |
| 6,452,487 B1 | | 9/2002 | Krupinski |
| 6,698,842 B1 | * | 3/2004 | Cornell ............... B60P 1/267 298/23 M |
| 8,777,324 B2 | | 7/2014 | Wink |
| 10,076,989 B2 | * | 9/2018 | Baldys ............... B60P 1/045 |
| 2010/0045093 A1 | | 2/2010 | Foisie |
| 2018/0065533 A1 | * | 3/2018 | Hertog ............... B60P 1/283 |

FOREIGN PATENT DOCUMENTS

| | | | | |
|---|---|---|---|---|
| ES | 2343611 A1 | * | 8/2010 | ............. B60P 1/045 |
| FR | 2865168 A1 | * | 7/2005 | ............. B60P 1/045 |
| GB | 2303105 A | * | 2/1997 | ............. B60P 1/045 |
| KR | 200142602 Y1 | * | 6/1999 | ............. B60P 1/267 |
| WO | WO-0194151 A1 | * | 12/2001 | ............. B60P 1/045 |
| WO | WO-2013073391 A1 | * | 5/2013 | ............... B60P 1/16 |

OTHER PUBLICATIONS

ISA/US Commissioner for Patents; International Search Report; PCT/US2019/069044; dated May 5, 2020.
Aceinna Sensors; www.aceinna.com/tilt-sensors/; 2018.
Demco; Side Dump Trailers; www.demco.com; 2019.
MAC Trailer; Introducing the new MAC Steel high Cube steel dump trailer; www.MACtrailer.com; 2017.
MAC Trailer; The lightest round bottom dump trailer on the market; www.MACtrailer.com; 2017.
MAC Trailer; Owner's Manual; 2017.

* cited by examiner

TIP OVER PREVENTION FOR DUMPING VEHICLES

CROSS REFERENCE TO RELATED APPLICATIONS

The present application claims the benefit of U.S. Provisional Patent Application No. 62/786,990, filed Dec. 31, 2018, the entire contents of which are expressly incorporated herein by reference.

TECHNICAL FIELD OF THE INVENTION

The present application relates to dumping vehicles, such as dump trailers, dump trucks, cement trucks and the like. More particularly, the present application relates to tip-over prevention for dumping vehicles.

BACKGROUND

Tilting or dump trailers are trailers having a bed or body portion configured for carrying cargo. These same trailers are configured to tilt by elevating one end or side of the bed when offloading (dumping) the cargo. On a rear dump trailer, the forward end of the trailer elevates as it pivots about an axis parallel to the axles of the trailer and the cargo is dumped from the rear of the trailer. On a side dump trailer, the tractor pivots along an axis generally perpendicular to the axis of the trailer axles so that the load is dumped to the left or right side of the trailer, as directed by the operators.

Both rear dump and side dump trailers are subject to tipping over under certain conditions. Such tip overs of the trailer often result in the tractor that is connected to the trailer also tipping over. Such tip overs can result in damages to property and personal injury.

Dump trailers frequently have either a flat bottom bed design or a round bottom bed design. Because of their superior weight distribution, round bottom designs are most often used for carrying bulk loads such as loads of grain, coal, dirt, and the like. Typically volume is not a limiting factor in the load capacity of either bed design; rather, the overall weight of the load is more commonly the limiting factor when loading a dump trailer.

Dumping trailers are useful as they offer a cargo-emptying feature, without requiring a dedicated vehicle, such as a dump truck. A dump trailer can be used as needed by attaching it to a tow vehicle. Examples of acceptable tow vehicles for towing a dump trailer include a conventional truck, tractor, pick-up truck, sport utility vehicle (SUV), and the like. Once the desired cargo has been hauled and dumped using the trailer, the tow vehicle is then free to detach from the trailer. The tow vehicle is then unencumbered and may be utilized for other purposes.

Dumping of the load is achieved through a pivoting of the bed. A common implementation is the use of a hydraulic, or pneumatic, cylinder pivotably coupled to the front of the trailer. When charged, the piston of the hydraulic or pneumatic cylinder extends axially in length, typically raising the front end of the bed upwards while the rear of the bed partially rotates about an axis which either comprises a pivot member which pivotably couples the bed to the wheel assembly, or in some cases the axis comprises the line where the rear wheels of the trailer engage the ground. An exemplary dumping trailer is sold by MacTrailers, whose website can be accessed at http://www.mactrailer.com/dump_trailers.aspx. The elevation of the front of the bed allows the cargo to slide downwardly and rearwardly out of the trailer, typically through a tailgate of the trailer. Lowering of the bed is accomplished through discharging the hydraulic, or pneumatic, cylinder, to cause the cylinder to retract in length. In a dump truck, the bed is dumped in a generally similar fashion.

Side dump trailers also empty by employing hydraulic or pneumatic cylinders to tilt the bed of the dump trailer so that the contents of the trailer can be removed from the trailer. However, side dump trailers rotate the dump truck bed about an axis that is perpendicular to the axis of the trailer's axles (and parallel to the longitudinal axis of the trailer), whereas the conventional "rear dump" trailers and dump trucks pivot the dump bed about an axis that is parallel to the axis of the trailer's or truck's axle. An example of a side dump trailer is shown at www.demco-products.com/trailers/demco-side-dump. 2016-2018.

Although both known flat bottom bed and round bottom bed trailers are well suited to their respective duties, room for improvement exists. Dump trailers often have their useful life cut short because of accidents. In addition to all the typical causes of harm to trailers, dump trailers are subject to a unique source of damage. Dump trailers are more subject than other trailers to being damaged from tip-overs (or turn-overs). The tip-over typically occurs during the time when the bed of the dump trailer is elevated and the load is being dumped.

The raising of the front of the bed to dump the cargo increases the likelihood of a tip-over. A dump trailer that is not in the process of dumping its cargo can usually withstand a wide range of lateral angles because of its relatively low center of gravity. However, as the load is raised, the center of gravity is also raised. This raised center of gravity makes the trailer less stable, and therefore more prone to tilt and possibly tip-over. For example, a trailer having its rear wheels placed on uneven ground and having its bed elevated, so that the load is far removed from the pivot point defined by the intersection of the back wheels and the terrain, has a higher center of gravity than if the bed were lowered, and therefore has an increased likelihood of tipping over.

As the cargo exits the trailer upon raising, one may expect that there would not be significant force placed upon the lifted bed. However, significant forces can be exerted on the lifted bed when a load becomes "stuck" in the trailer, and it does not slide out readily when the dump bed is lifted. Such a scenario is common with materials which are damp, compactable, or sticky. As such, the front end of the trailer can be in a position where it is raised at a significant distance (e.g. 20 to 30 feet) above the ground, and still contains a significant amount of weight, when one adds the weight of the dump trailer to the weight of the load that is stuck inside the bed. Surprisingly, it is estimated that approximately 40% of dump trailers will at some point during their existence tip-over.

Another way to describe this situation is that a very long moment arm is created when the front end of the bed is raised very high to ensure that the cargo will slide out. Where the dump trailer is tilted laterally, even slightly about its longitudinal axis, an elevated front end of the bed creates the tendency for the trailer to tip-over. This tendency to tip is exacerbated as the length of the dump trailer increases. This is because as the length of the trailer increases, so does the height that must be achieved to encourage its cargo to dump.

Additionally, the tendency of a dump trailer to tip in response to a very slight tilt is greatly exacerbated if the cargo is resistant to dumping. This is because cargo remaining in an elevated truck bed raises the center of gravity of the trailer, thereby increasing the torque on the pivot point, which increases the propensity of the trailer to tip when the tilting places the centerline of the weight off the center line of the trailer.

Unfortunately, it is difficult for an operator of a dump trailer to detect this dangerous situation, and to take corrective action prior to a tip-over. First, it is simply difficult for an operator to detect the slight degree of tilt that can be dangerous with dump trailers. This difficulty is especially acute at night when it is more difficult to visually perceive the degree of tilt. Second, the degree of tilt of the dump trailer may be hidden by the operator's location. An operator may never have to exit the interior of the tow vehicle to operate a dump trailer in tow vehicle dump trailer combinations. In this combination, the tow vehicle may be on level ground while the dump trailer is upon ground with a slight slope.

Finally, there is the situation where a tilt is "dump induced" upon the dump trailer. In this situation, the dump trailer initially rests level about the longitudinal axis, or at least well within a safe tilt. However, the act of dumping the dump trailer causes a redistribution of weight upon the trailer which causes the center of gravity of the trailer not to be centered on the longitudinal axis, thereby inducing a tilt into the dump trailer.

A variation of this situationally induced tilt often occurs when the trailer is resting on soft ground, such as at a landfill, construction site, mining site, or farm where even "level" dump trailers have been known to tip over. In such soft ground locations, the weight of the trailer may impact the ground on which the trailer rests unevenly, causing one set of wheels (e.g. the right side) to sink further than the other (e.g. left side) set of wheels. This uneven sinking can therefore result in the trailer being placed in an unstable tilting position.

These dump trailers can also tip over on level ground if one or more of the rear tires on one side are low in air pressure or flat. Even if the rear trailer tires on one side of the trailer are 50% or more worn and the opposite side has new or like new tires, a tip over can occur because the angle before lifting can be within a safe angle but as the body pivots up on the rear axle and the tires have differential wear as described above, the upper end will have a tendency to move sideways and can cause the trailer to tip over.

Unfortunately, the use of a known tip over sensor that is placed on the axle of a trailer will not detect such a tip over condition until it is likely too late to stop the tip over from occurring.

Various attempts to detect and prevent dump trailer tilt have been taken in the prior art, such as the integration of spirit levels and pendulum levels within the cab of the tow vehicle. However, spirit and pendulum levels, when used within the tow vehicle, are not representative of the actual tilt condition of the dump trailer. As previously noted, the angle of tilt of a tow vehicle may be different than the tilt of the attached dump trailer in a tow vehicle dump-trailer combination.

Additionally, placing a level device upon the dump trailer is still insufficient. A level device upon the dump trailer requires that the driver leave the tow vehicle, check the level device, and return back to the tow vehicle to begin the dumping operation. This check may be overlooked where rapid transportation and dumping turn-around times are necessary. Further, even if the level check is not overlooked, such devices are typically used in a static and not dynamic sense. Thus, even under the best of conditions, such devices do not work to warn the operator of the induced tilt situation.

Other attempts to detect and prevent dump trailer tilt include various monitoring systems designed to inform or warn the operator when a tilt either exists or develops in the dump trailer. These detection systems of the prior art include tilt detection sensors which are mounted on the rear axle of the vehicle. However, it has been discovered that such devices do not indicate whether the trailer tilt is level, as the suspension system of the vehicle will "hide" that the trailer is not level. This axle attachment of a tilt sensor does not properly represent the levelness of the body as the suspension, whether airbags or springs, will flex without causing the axle to tilt. For example if a dumping vehicle was loaded heavy on one side of the cargo body and were setting on a flat and level concrete slab, the axle would be depict a level indication; however, the dump bed could be significantly off level-a potential tip-over scenario. In this scenario, it is likely that the trailer would begin to fall toward the ground prior to the axle tipping. Such systems often fail to detect an unsafe tilt condition until such time as the axle is being raised off the ground, which is often too late for any corrective action to be taken.

Additionally, merely warning the operator is often not sufficient to remedy the problem, as operators may fail to respond to the warning. Even when the operator is alert and appropriately responds to the warning, his response may not be fast enough to prevent a tip-over. In some cases, the operator may actually choose to ignore such warnings. In essence, the problem is not solely one of accurately informing the operator of a dangerous tilt situation in his dump trailer. Instead, the actual problem also includes dealing with the operator's willingness to respond to the warning, and the operator's ability to respond quickly enough to the warning. Therefore, further technological developments are desirable in this area.

SUMMARY

One embodiment of the present application includes a tip-over prevention system for dumping vehicles. Other embodiments include unique tip-over prevention apparatuses, systems, and methods.

In one form, the claimed technology relates to a tamper-resistant, multi-component system intended to detect and warn of dangerous tip-over situations while taking corrective action. In one simplistic form, this system can consist of: a) a lateral tilt detection device, b) a warning device, c) a device that when triggered causes a raised dump bed to automatically lower back down, and d) an ensured power source.

The tilt detection device can be attached directly to the body or sub-body frame or chassis, which is in turn attached to the cargo body (e.g. a dump bed, tilting trailer, or other dumping cargo hauling container). It has been discovered that placing the tilt detector in this location enables a determination to be made if an uneven weight distribution is present, from side to side, prior to raising the cargo body. Further embodiments, inventions, forms, objects, features, advantages, aspects, and benefits of the present application are otherwise set forth or become apparent from the description and drawings included herein.

One feature of the present invention is that a preferred embodiment contemplates the use of multiple sensors placed one one or more of the load carrying bed and chassis to provide additional trailer reference points to help prevent some of the more difficult-to-detect tip over situations such as those that occur on soft ground and those that arise from differential tire wear and inflation conditions. The advantage of the multiple sensors is that they can better detect whether the trailer has deviated by more than 15% of its desired position and orientation.

Also trailers may tip over because the driver fails to raise the body up into the last section of the hoist. Moving the trailer before the body is fully raised makes it very top heavy. One feature of a preferred embodiment of the present invention is that the system and controller can be programmed to set the trailer brakes and hold them to engage the brakes until the hoist has moved into the last section, thereby forcing the driver to remain stationary, which helps to prevent these types of accidents.

Another feature of a preferred embodiment of the present invention is that it may include a speed sensor for preventing a dump trailer from accidently raising up while driving down the highway which can cause great damage to bridges, power lines and over passes.

A further feature of the present invention is that it may include a text alert feature that alerts one or both of the driver and the fleet operator if the tip prevention system of the present invention has either been disarmed or is otherwise inoperable.

Additionally, it is a feature that the driver can be provided with a battery back up to provide power to the system in case power from the trailer/tractor becomes unavailable such as if the user attempts to disarm the system by removing its battery.

BRIEF DESCRIPTION OF THE DRAWINGS

The description herein makes reference to the accompanying drawings wherein like reference numerals refer to like parts throughout the several views, and wherein.

DETAILED DESCRIPTION

For purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated device, and any further applications of the principles of the invention as illustrated therein being contemplated as would normally occur to one skilled in the art to which the invention relates.

As utilized herein, the term dumping vehicle includes dump trailers, dump trucks, cement mixers, and any other vehicles or which include a bed or body portion (e.g. a cargo body) which is configured to tilt by elevating one end or side during offloading ("dumping") the cargo. Although the term dump trailer is utilized in the following discussion with regard to FIGS. 1-6, the present application has equal applicability to various other dumping vehicles.

Figure 1:
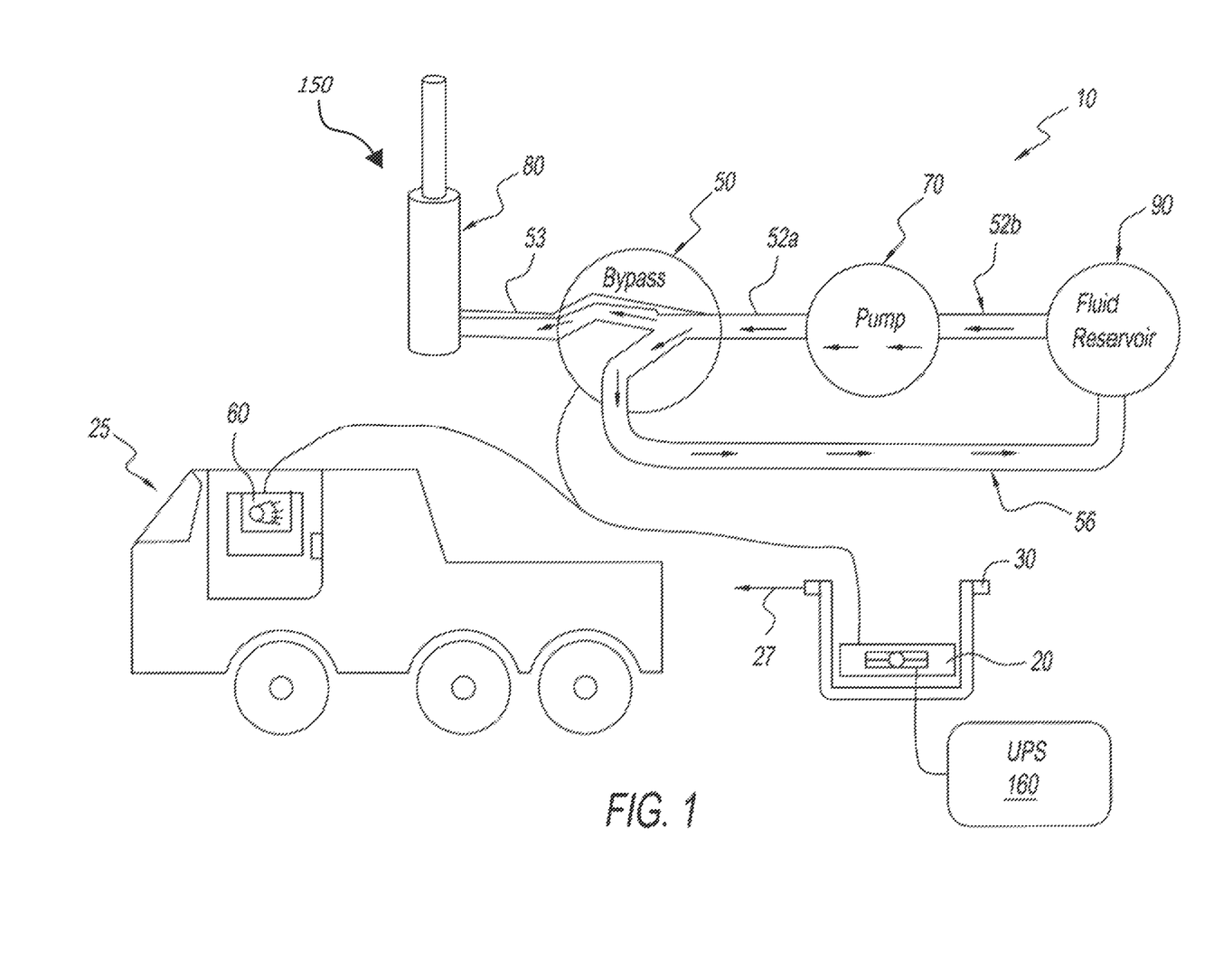
FIG. 1 represents a schematic view of the primary components for a system for the detection of and response to lateral tilt in a dump trailer.
Figure 2:
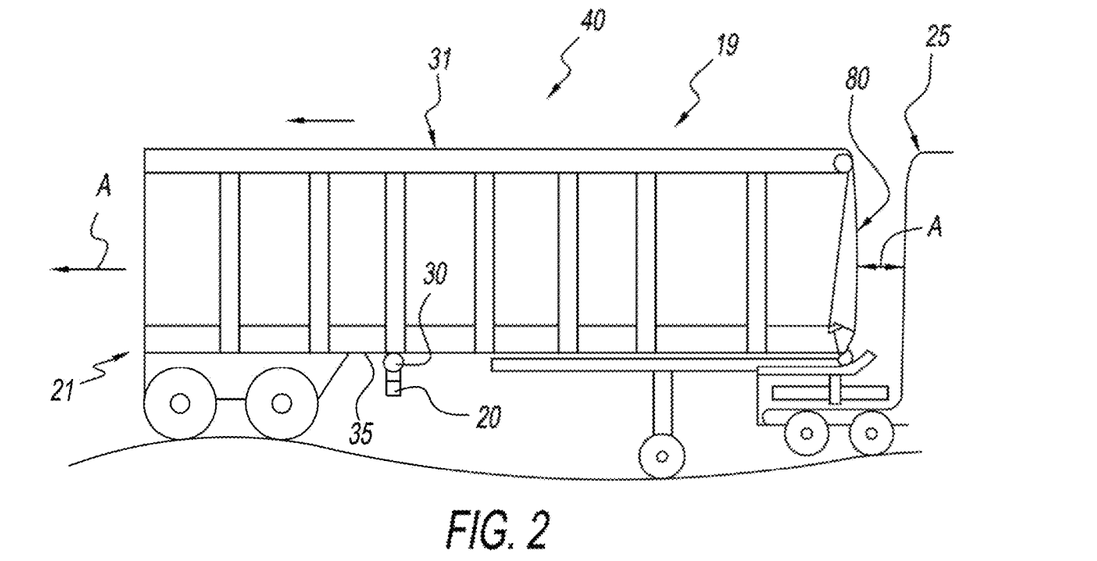
FIG. 2 is a schematic view of the level detector shown on a trailer in the lowest or travel position.
Figure 3:
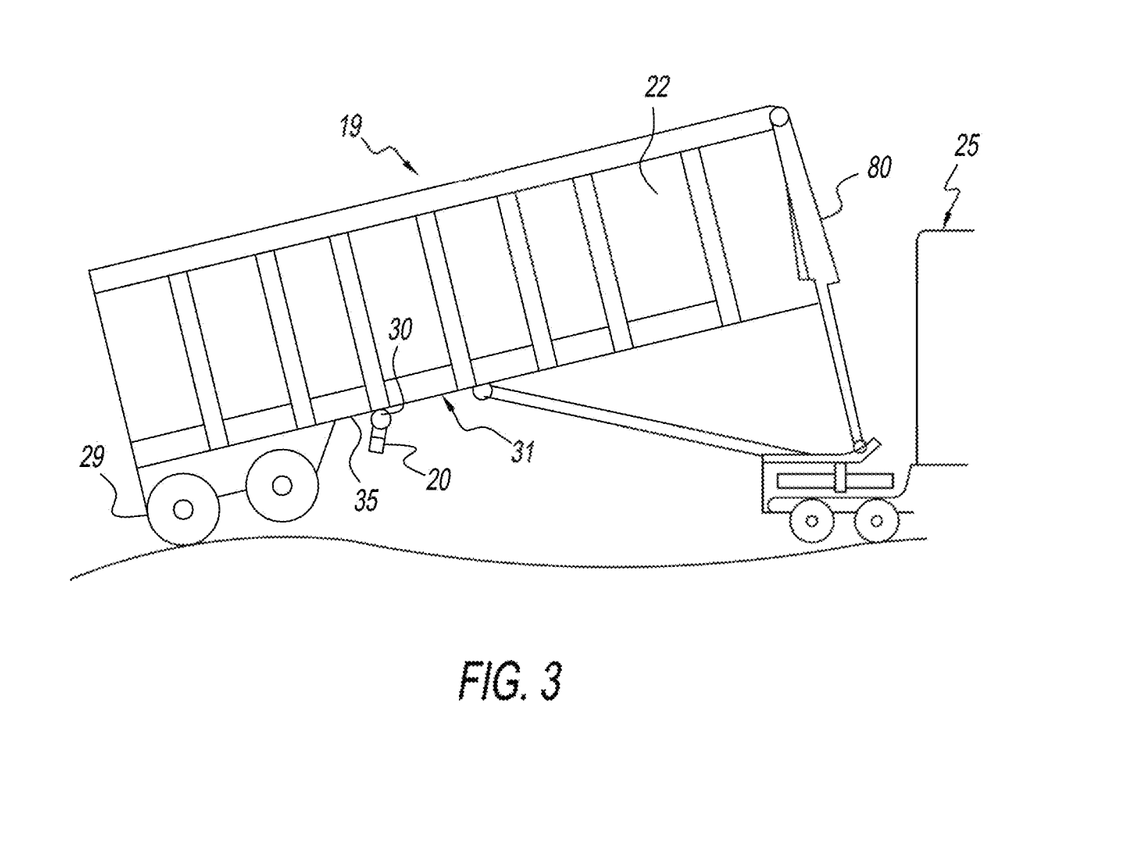
FIG. 3 is a schematic view of the level detector shown on a trailer in the raised position.

FIGS. 1-3 present an illustrated overview of a typical embodiment of a system 10 for the detection of, and response to, lateral tilt in a dump trailer 40 that is coupled to a tow vehicle 25, such as a semi-tractor. The system 10 typically includes a tilt sensor 20. It is contemplated that the tilt sensor 20 can take a variety of forms including a slope detector, inclinometer, tilt box, or any other sensor/sensor array which can detect tilt, or through which tilt can be indirectly calculated. As illustrated in FIGS. 1-3, the tilt sensor 20 takes the form of a threshold angle detector (TAD) 20.

Tilt sensor 20 is depicted as being affixed to a longitudinal swing hinge 30 that pivots about a laterally extending axis, so that the TAD 20 can remain level (front-to-rear) independent the raised height of the dump bed 19. However, it is further contemplated that the TAD 20 can be mounted to a variety of locations on the dump bed 19, body 22, or chassis 21. Unlike systems of the prior art, which include tilt sensors mounted to the axle, it has been discovered that mounting the TAD 20 to the dumping bed 19 or chassis 21 can detect unsafe tilt prior to the axle being lifted from the ground (e.g. if an unbalanced load is raised in the cargo body 40, it has been discovered that tilt can be detected in the dumping bed 19 or chassis 21 prior to tilt being detected in the axle). As illustrated, the swing hinge 30 is affixed to the bottom of the dump trailer 40. In one specific form, the TAD 20 is mounted to a rear cross member (not shown) of the chassis 21.

The TAD 20 is operationally connected to a normally closed hydraulic bypass valve 50 and operationally connected to a warning buzzer 60 such that both the hydraulic bypass valve 50 and warning buzzer 60 are able to receive tilt signals from the TAD 20, either directly or through a controller (not shown). The hydraulic bypass valve 50 is positioned in a fluid line 52a, 52b between the hydraulic pump 70 and the hydraulic piston 80 such that the hydraulic fluid travels from the hydraulic pump 70 through the hydraulic bypass valve 50 to the hydraulic piston 80. The alternate flow of the hydraulic bypass valve 50 comprises a return fluid line 56 that extends between an upstream end at bypass valve 50, and a downstream end at fluid reservoir 90.

As illustrated in FIG. 1, the lateral tilt detection device 20 is operationally connected to a warning device 60 and operationally connected to a hydraulic bypass device 50. The hydraulic bypass valve 50, when activated, presents an alternative flow for hydraulic fluid to return to the hydraulic reservoir 90 through the return line 56 instead of being used to provide power to elevate a hydraulic raise device 150.

As best shown in FIGS. 1-3, the system 10 for the detection of and response to lateral tilt in a dump trailer typically includes a lateral tilt detector device 20, which in one form preferably comprises a single threshold angle detector (TAD) 20. In this specific form, the threshold angle of the TAD 20 is generally fixed with a common value being 2 degrees. The TAD 20 is usually attached to the bottom of the bed or underside of the dump trailer 40 via a swing hinge 30 that pivots about an axis 27, generally perpendicular to the longitudinal axis A of the trailer. Pivot axis 27 is also generally (but usually not perfectly) parallel to the dumping pivot axis of the trailer, which, for the Applicant's trailers comprises the line along which the rear most set of tires 29 of the trailer 40 engage the ground surface. The free pivotal movement of the swing hinge 30 about axis 27 isolates the TAD 20 from the effects of the elevation of the bed 31 of trailer 40 during dump operations. Attaching the TAD 20 to the bottom support rail 35 of the bed 31 or underside of the dump trailer 40 permits accurate lateral tilt detection of the dump bed 31.

There are numerous other possible implementations of the lateral tilt detector device 20. Examples include: the above implementation but with a user adjusted variable TAD 20; two axis tilt detectors that can be either user, variable or fixed, in combination with a variable response unit. Additionally, one could use weight distribution sensors (not shown) in combination one or more single or two axis tilt detectors that are either, user variable or fixed, with a variable response unit; and the like. Note that the variable response unit of the examples is variable in the sense that varying conditions, such as variable tilt angles may be employed as the trigger point that commences operation of the warning device 60 and actuation of the bypass valve 50 may trigger a tilt warning.

Figure 4:
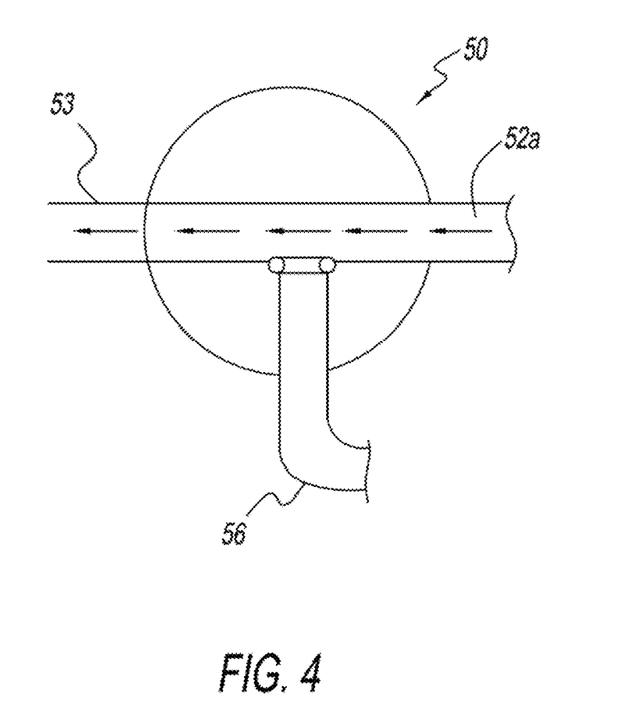
FIG. 4 is a schematic view of the bypass valve in the closed position.

In the typical implementation, the TAD 20 is operationally connected to a hydraulic bypass valve 50. Under normal conditions, the hydraulic bypass valve 50 remains closed. When "closed", as is illustrated in FIG. 4, the bypass valve 50 is positioned so that fluid flowing from the fluid reservoir 90 is allowed to be pumped through valve 50, and out the outflow tube 53, and into the upstream position of hydraulic piston 80. Conversely, when the bypass valve 50 is in the open position, depicted in FIG. 5, the valve is positioned so that fluid flowing from the pump 70 is blocked, and fluid in the hydraulic piston 80 and outflow tube 53 is allowed to flow backward through return tube 56 to return the fluid to the fluid reservoir 90. When in the closed position, the valve 50 permits raising the bed 31 of the dump trailer 40 through the normal flow of hydraulic fluid from a hydraulic fluid storage reservoir 90 through a hydraulic pump 70 to a hydraulic piston 80 and charging that hydraulic piston 80. Lowering of the dump bed is achieved by placing the valve 50 in the open position which allows the hydraulic piston 80 to discharge wherein hydraulic fluid returns back to the hydraulic fluid storage reservoir 90.

Figure 5:
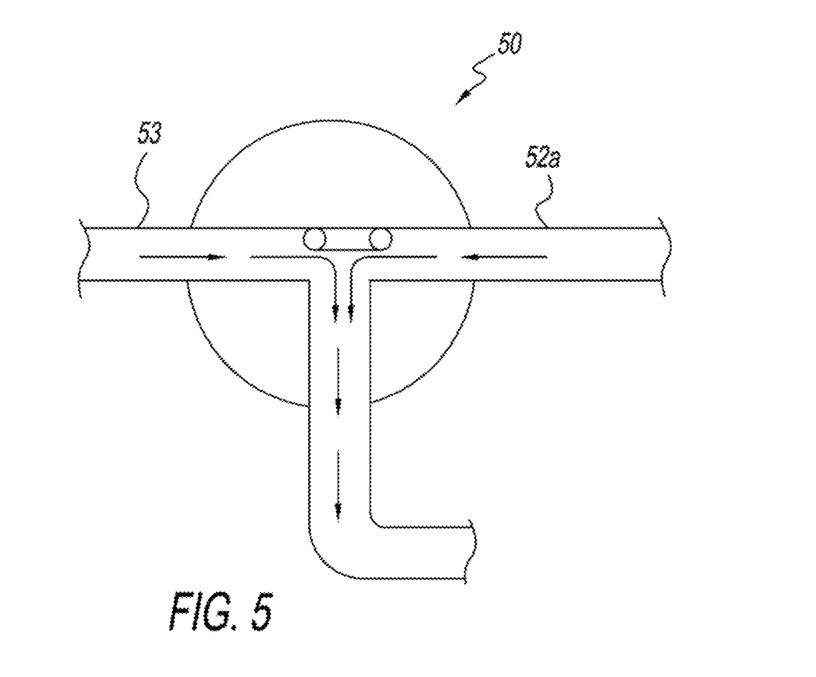
FIG. 5 is a schematic view of the bypass valve in the open position.

However, under tilt conditions the TAD 20 signals the hydraulic bypass valve 50 to open. This condition provides the hydraulic fluid with an alternative path. This alternative path begins in fluid line 53 between the hydraulic pump 70 and hydraulic piston 80 and ends back at the hydraulic fluid storage reservoir 90 as shown in the arrows of FIG. 5. With the weight of the dump bed pressing down upon the hydraulic piston 80, the hydraulic fluid takes the path of least resistance flowing back from piston 80, through valve 50, and into return line 56 and into the hydraulic fluid storage reservoir 90. However, the lowering of the bed 31 under a tilt condition is not uncontrolled. This is because the rate of flow afforded to the hydraulic fluid by an open hydraulic bypass value 50, through the alternative flow path, is great enough to always discharge the hydraulic piston 80, while not great enough to make the discharge uncontrolled. In this manner, the bed 31 descends at a controlled rate.

In one form, the opening of the hydraulic bypass valve 50 and the corresponding lowering of the dump bed 31 both occur and cease without the intervention of a user. This is because the TAD 20 signals the hydraulic bypass valve 50 to open upon tilt detection instead of warning a user. Additionally, the preferred "lower when tilt determined" protocol correctly responds to a dynamic or situationally induced tilt. This is because the TAD 20 signals the hydraulic bypass valve 50 to open only when it detects a dangerous tilt. It does not signal the hydraulic bypass valve 50 to open under other conditions. It has been found by the Applicant that the tilt detector is preferably set to between about 1 and 3 degrees of tilt, and preferably about 2 degrees of lateral tilt. If a lateral tilt of the set value (e.g. 2 degrees or greater) is sensed by the lateral tilt detector 20, the bed 31 lowering tilt detected protocol is initiated to lower the bed.

A typical implementation also has the TAD 20 operationally connected to a user warning buzzer 60 disposed in the tractor 25 cab. The warning buzzer 60 receives a signal from the TAD 20 during the existence of a tilt condition to give an audible warning to the driver. Note that the warning buzzer 60 is not active when there is no tilt condition or when a tilt condition has ended. This is because the TAD 20 signals the warning buzzer 60 only when there is a dangerous tilt condition.

This tilt condition can occur, and the warning buzzer (light) be activated not only when the trailer is in the process of dumping, but also prior to the commencement of the dumping, if the tilt detector detects an unsafe tilting situation when the driver actuates the lift. Such an actuation of the warning buzzer prior to the beginning of the lift can be used by the driver as a check to determine if his truck is at a good dumping location, or whether it needs to be moved to a better location before dumping. Additionally, the detection by the tilt detector of an unsafe tilt condition (prior to lifting) will automatically actuate the warning buzzer/light upon actuation of the trailer's dump actuator, and will prevent the trailer from lifting into a dump configuration. There are of course numerous other possible embodiments of the warning buzzer 60. Examples include but are not limited to: warning bells, warning lights, warning lights in conjunction with audio warnings, gauges, and the like.

An additional variation is to place a warning light on the trailer that is positioned to be visible to the driver of the truck when the driver is seated in the cab. One benefit of this approach is that the placement of the light on the trailer does not require the cab of the tractor to be retro-fitted with the light, nor does it require any communication line to be installed between the trailer and the cab. This ability to avoid retro-fitting the tractor is valuable, as the frequent exchange between particular tractors and the trailers to which they are attached makes it difficult to ensure that all trailers having the warning system will always be mated with a tractor that includes a warning buzzer or light.

Other embodiments exist that have the warning buzzer 60 configured to give an audible signal in the event of tampering with the system. For example, embodiments are configured to also activate the warning buzzer 60 when either the system's 10 power, lateral tilt detection device 20, or hydraulic bypass valve 50 have been tampered with.

The system 10 is typically powered by an uninterruptible power source (UPS) 160. Normally this powers source is the anti-lock brake system (ABS) of the dump trailer 40, since the ABS system is in an "always on" state when the truck 25 to which the trailer 40 is attached is running Also, the ABS is typically needed for normal dumping operation for a dump trailer 40. Finally, the ABS of the dump trailer 40 is such a critical system as to deter anyone from tampering with it to disable the system 10 for the detection of and response to lateral tilt in a dump trailer 40.

There are numerous alternatives to using the ABS to power the system 10. The system 10 could be powered directly from the electrical power supplied to the hydraulic pump 70, from electrical power supplied to the dump trailer light system, from the towing vehicle's 25 battery charging system, the towing vehicle's 25 battery system, and the like.

Figure 6:
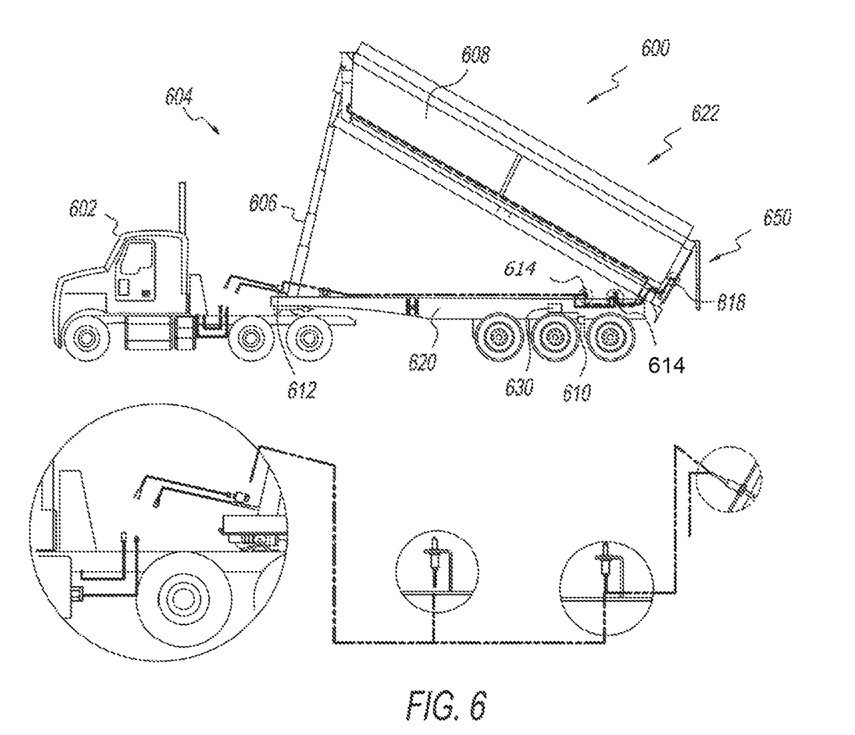
FIG. 6 depicts one form of a tip-over prevention system for a dump trailer.

FIG. 6 depicts one form of tip-over prevention system 600 for dumping vehicles. A dump trailer 604 is depicted as being pulled by a tractor cab 602. A dump bed 608 can be raised and lowered from the trailer chassis 620 through a fluid powered piston 606. Although the piston 606 is depicted as a hydraulic piston, a pneumatic piston, or any other fluid powered piston 606 is contemplated herein. A fluid release valve 612 is in fluid communication with the fluid powered piston 606. When activated, the fluid release valve 612 releases fluid from the piston 606 thereby allowing the piston 606 to retract, and the dump bed 608 to lower from a raised position (depicted at 622) to a lowered position where a portion of the dump bed 608 rests on the trailer chassis 620.

A tilt detector 610 detects a current tilt (e.g. tilt to the left or right, not the degree to which the bed 608 is raised). It is contemplated that the tilt detector 610 can take the form of an inclinometer, slope detector, tilt sensor, or any other device known to a person of skill which can detect tilt, or through which tilt can be determined. In one exemplary form, the tilt detector 610 can be a TAD as was discussed with regard to FIGS. 1-3, In a further exemplary form, the tilt detector 610 is able to detect tilt without any moving components. Tilt detectors are available from a variety of sources, such as ACEINNA, Inc. of One Tech Drive, Suite 325, Andover, Mass., 01810. See ACEINNA.COM. The lack of moving components in this exemplary tilt detector 610 has been discovered to be especially beneficial as debris cannot "clog" the components. Although the tilt detector 610 is depicted as being mounted on a rearward cross-member of the trailer 604, it is contemplated that the tilt detector 610 can be mounted in a variety of locations on the dump bed 608 or trailer chassis 620.

The tilt detector 610 is in electronic communication with a tip-over prevention controller 630. The tip-over prevention controller 630 can form a portion of a processing subsystem including one or more computing devices having memory, processing, and communication hardware. The tip-over prevention controller 630 may be a single device or a distributed device, and the functions of the controller may be performed by hardware or software. In one form, the tip-over prevention controller 630 can be disposed within a tilt box enclosure which also houses the tilt detector 610.

The tip-over prevention controller 630 can be placed in electronic communication with the fluid release valve 612, and can activate and deactivate the fluid release valve 612. The tip-over prevention controller 630 receives the current tilt status from the tilt detector 610. The current tilt status can be communicated to the controller 630 from the tilt detector 610 in a variety of ways as would be understood to a person of skill. The tip-over prevention controller 630 determines if the current tilt detected by the tilt detector 610 exceeds a tilt threshold. If the current tilt exceeds the tilt threshold, the tip-over prevention controller 630 will activate the fluid release valve 612, thereby causing the release of fluid from the piston 606. This results in the dump bed 608 being lowered from the raised position 622 to a lowered position where a portion of the dump bed 608 rests on the chassis 620. This automatic lowering of the dump bed 608 has been found to significantly reduce tip-overs due to operator error by automatically lowering dump bed 608 in the event the operator attempts to raise the bed 608 on an unsafe incline (e.g. due to soft ground, uneven ground, an unbalanced load, or the like). As the dump bed 608 lowers, so does the center of gravity, thereby significantly reducing the likelihood of a tip-over.

The tilt threshold is a preset value which determines at which level of tilt the dump bed 608 will be automatically lowered by the tip-over prevention controller 630. In one form, the tilt threshold can be programmed into the tip-over prevention controller 630 in a manner such that the value cannot be altered by a driver or operator. The specific tilt threshold value can be chosen depending upon the specific user and/or the specific application. For example, a trucking company which has many novice drivers may want a lower tilt threshold than a trucking company with expert drivers who frequently dump gravel on uneven terrain. In various applications, the tilt threshold can be preset to a value which ranges between substantially the tilt value at which the dump trailer 604 will tip-over (on the high end) to one or two degrees off level (on the lower end). In one non-limiting form, the tilt threshold can approximate two degrees off level.

In one exemplary form, a bed position sensor 614 is placed in electronic communication with the controller 630. The bed position sensor 614 is depicted as a contact sensor which detects contact between the dump bed 608 and the chassis 620 which can be utilized to detect and/or determine if the dump bed 608 is lowered onto the chassis 620 or is raised therefrom. However, it is contemplated that a variety of bed position sensors 614 can be utilized to determine the position of the dump bed 608. When the current tilt exceeds the tilt threshold, the controller 630 may signal the fluid release valve 612 to release fluid from the piston 606 until the bed position sensor 614 indicates the dump bed 608 is in a lowered position.

In a further form, a tailgate position sensor 618 can be located on the bed 608 in a manner sufficient to determine a position of the tailgate 650 (e.g. open or closed). This tailgate position sensor 618 has been determined to be of significant benefit in various application, as will be described hereinafter. The tailgate position sensor 618 is placed in electronic communication with the controller 630. The controller 630 will not permit the bed 608 to be raised if the tailgate position sensor 618 determines the tailgate 650 is in a closed position. Additionally and/or alternatively, if the controller 630 detects the bed 608 is in a raised position 622 and the tailgate 650 is in a closed position, the controller 630 will activate the fluid release valve 612 thereby lowering the bed 608. In this manner, the present system 600 can prevent tip-overs due to an operator forgetting to remove the safety locks on a tailgate prior to raising the bed 608.

Mining operations in various countries utilize sealed trailer covers to prevent theft of the minerals (e.g. gold, silver, zinc, etc.) as the minerals are hauled from the mines. These sealed trailer covers may utilize locks similar to those on shipping containers (e.g. a lock that has to be cut off once installed and is therefore tamper evident). When these materials arrive to the place of delivery, an inspector inspects these locks and removes them. However, because this material is often powder, the tailgates have "Turn Buckle Security" locks that retain the tailgate 650 tight to prevent leaking of the materials. Often, drivers forget to unscrew these turn buckles prior to raising the bed 608 to unload. This failure to open the tailgate 650 prevents the load from sliding out, and can cause the bed 608 to tip-over side-ways and/or brake the hoist in the front resulting in a totaled out trailer.

A further form of a tailgate position sensor 618 will now be described. In this form, the tailgate position sensor 618 is a push button switch located between the tailgate 650 and a rear post of the trailer, such posts are frequently utilized to help support the shape of the body of the dump bed 608. When the tailgate 650 is closed, the switch 618 is compressed allowing electric current (12 or 24 volts) to pass through to the bed position sensor 614, which can also be a push button type switch. In this form, the bed position sensor 614 is located between the trailer chassis or A-frame and the bed 608. This switch, when in a compressed position, does not allow current to pass through to the fluid release valve 612. Let us now assume the bed 608 is in a lowered position and the tailgate 650 is closed. With the tailgate 650 closed, the tailgate position sensor 618 permits current to flow through the sensor 618 to the bed position sensor 614. When the dump bed 608 contacts against the bed position sensor 614, the bed position sensor 614 prevents current from being transferred to the fluid release valve 612. However, if the bed 608 is raised with the tailgate open, the tailgate position sensor 614 will permit current to flow to the bed position sensor 614 and the bed position sensor 614 will permit current to flow to the fluid release valve 612, thereby preventing the dump bed 608 from being raised without the tailgate 650 opening. In this manner, the present system 600 prevents the driver from raising the bed 608 unless the tailgate 650 opens shortly after the bed 608 is lifted off from the bed position sensor 614, When the tailgate 650 swings open, the tailgate position sensor 614 prevents current from flowing to the bed position sensor 614, and therefore prevents current from flowing to the fluid release valve 612, which permits the dump bed 608 to be raised.

In various forms, the system 600 can be easily retrofitted into preexisting dumping vehicles. To achieve this, the system 600 can be packaged as a kit which includes a tilt box housing the tilt detector 610 and the controller 630. The kit can include plug and play harnesses, or wire, to connect the controller 630 and other system components such as the fluid release valve 612. The kit further includes the fluid release valve 612 as well as a valve cartridge, coil, and valve body. In one specific form, the valve cartridge is a 40-GPM 5000 PSI valve cartridge, and the valve body is a 2-way valve body; however, a variety of fluid release valves 612 are contemplated herein. The kit can include plumbing, including fittings, to fluidly connect the fluid release valve 612 to the piston 606. In one specific form, the tilt detector 610 and controller 630 receive power from the ABS system of the dumping vehicle 602.

Figures 7, 7A, 7B, 7C, 7D, 7E:
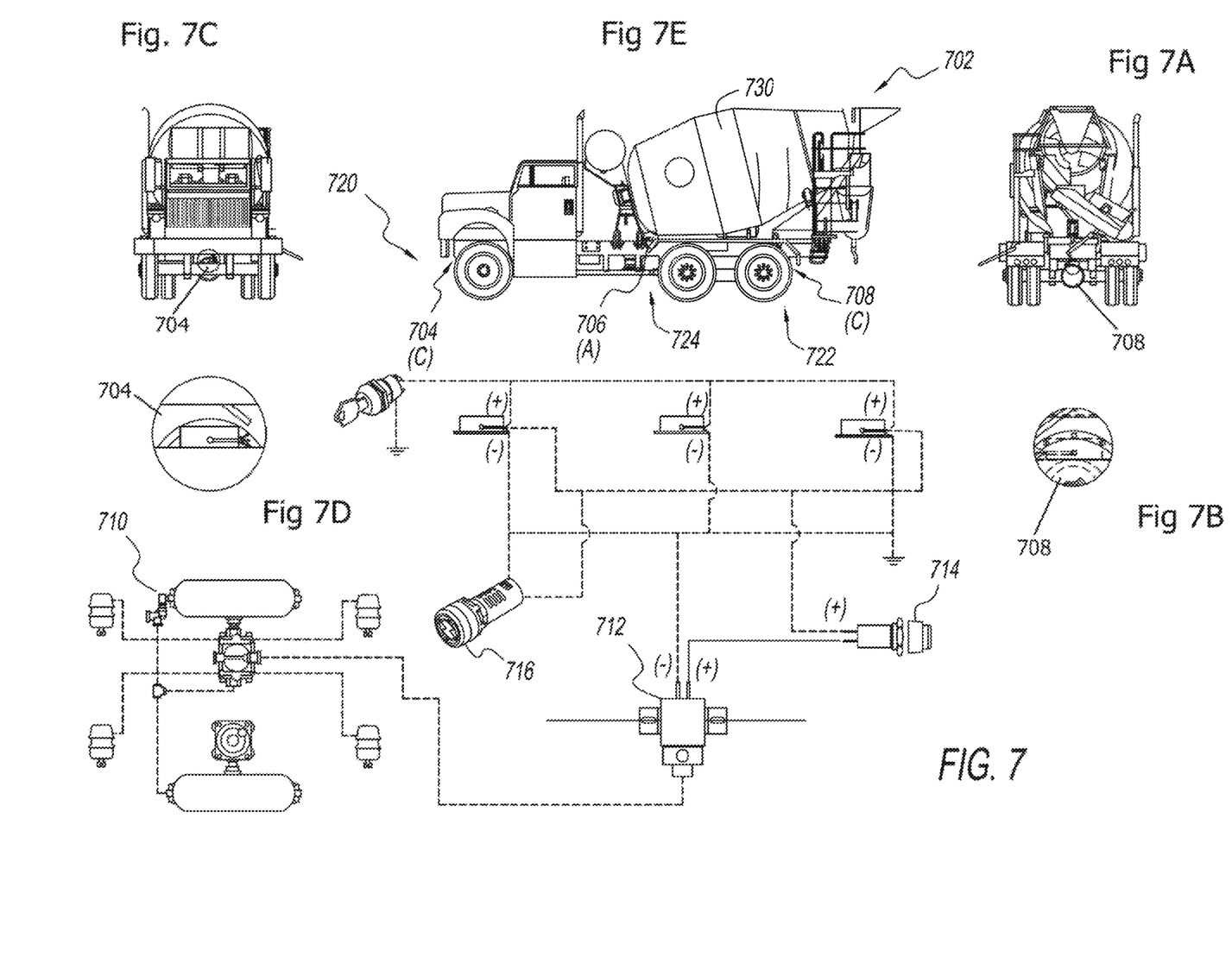
FIG. 7 is a schematic view of the circuitry for operating the tip prevention system of the present invention with a mixer truck.
FIG. 7A is a rear view of a mixer truck embodying the present invention.
FIG. 7B is an enlarged view of the circled area of FIG. 7A.
FIG. 7C is a front view of a mixer truck embodying the present invention.
FIG. 7D is an enlarged view of the circled area of FIG. 7C.
FIG. 7E is a side view of a mixer truck embodying the present invention.

FIG. 7 depicts one form of a mixer vehicle tip-over prevention system. A mixer vehicle 702 is depicted as a concrete mixer; however, a variety of mixer vehicles are contemplated herein. A first tilt detector 704 can be mounted to the foremost axle 720. A second tilt detector 708 can be mounted on the rearmost axle 722. A third tilt detector 706 can be mounted on the truck chassis 724 below the mixer barrel 730. The tilt detectors 704, 706, and 708 can take a variety of forms similar to tilt detector 610 from FIG. 6.

The tilt detectors 704, 706, 708 can be integrated with one or more controllers as was discussed with controller 630 of FIG. 6. Should a current detected tilt of one or more of the first tilt detector 704, second tilt detector 708, or third tilt detector 706 exceed a preset tilt limit, a braking system 710 of the mixer vehicle 702 is activated. Depending upon the specific application and desired safety parameters, the braking system 710 may be activated in response to one, two, or all three of the tilt detectors 704, 706, 708 determining a present tilt exceeds a threshold tilt limit. In a preferred form, the braking system 710 is activated in response to any of the tilt detectors 704, 706, 708 determining a present tilt exceeds the threshold tilt limit. In one form, activating the braking system 710 includes engaging the parking brakes of the mixer vehicle 702 via a solenoid 712 integrated into the parking and/or emergency brake.

As was described with FIGS. 1-3, an alarm can be activated when the current tilt exceeds the threshold tilt limit. This alarm can be an audible alarm, a light, or any other alarm type suitable to make a user aware of this alarm condition.

An override button 714 is depicted as being electrically connected to the braking system 710 (e.g. either directly, or indirectly via one or more controllers). When the braking system 710 has been engaged, a driver can depress the override button 714 and, while continually depressing the override button 714, may reverse the vehicle out of the unsafe tilt condition. However, should the vehicle be placed in drive or a forward gear selected, the system 710 will again engage the braking system 710. When the vehicle is to a safe location, e.g. when the tilt detectors 704, 706, and 708 signal a current tilt is less than a preset tilt limit, the alarm will stop sounding, the driver may remove their hand from the override button 714, and can proceed to drive the vehicle as normal.

Figure 8:
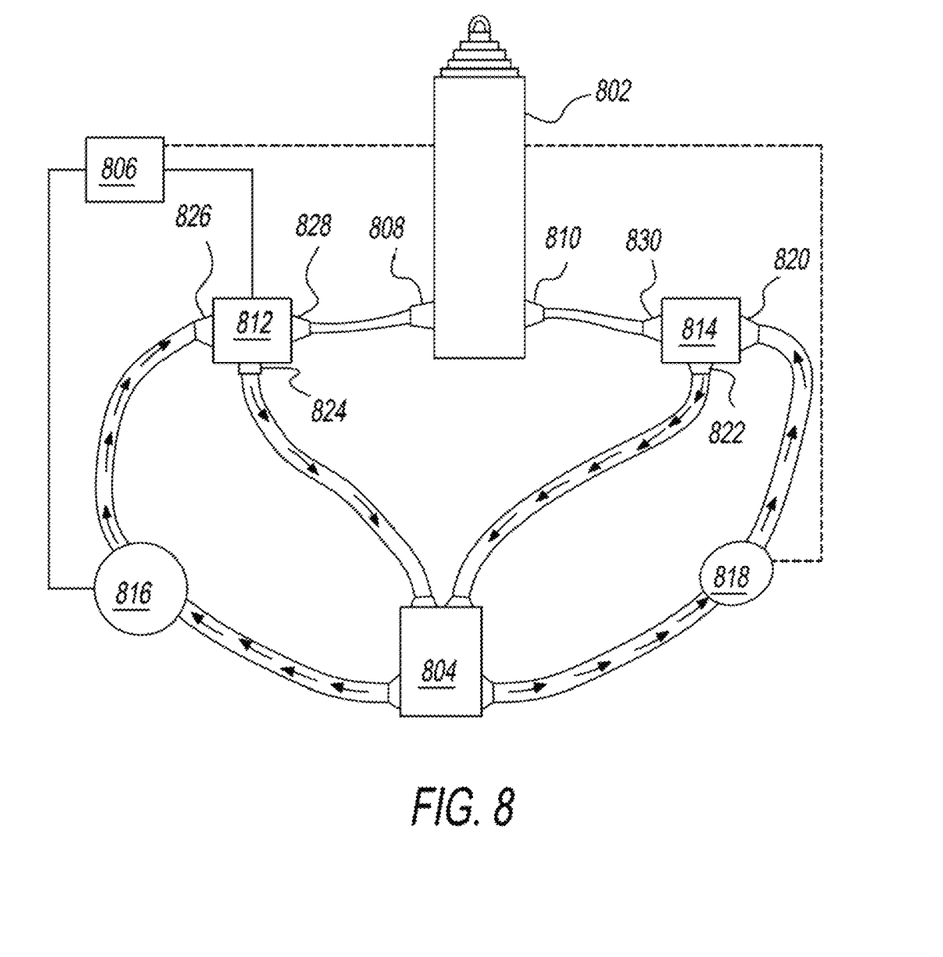
FIG. 8 depicts one form of a dual port piston, depicted as being powered by two fluid pumps.

Referring now to FIG. 8, an exemplary dual port piston 802 will be described. This piston 802 is depicted as including two ports, including first fluid release port 808 and second fluid release port 810. The first fluid release port 808 is in fluid communication with first release valve 812, and the second fluid release port 810 is in fluid communication with the second release valve 814.

To increase the speed at which the dumping bed of a vehicle can be lowered, or raised, it has been discovered that both ports 810, 808 can be utilized. As is illustrated, a fluid reservoir is depicted at 804. Fluid from this reservoir is drawn into first 816, and second 818 pumps. This exemplary system includes two fluid pumps 816, 818. In a preferred form, both fluid pumps 816, 818 are driven through a Power Take Off, commonly referred to as a PTO, of the transmission of the vehicle to which the dumping bed is attached.

Once the fluid has been acted on, and pressurized by, the pumps 816, 818, the fluids travel to release valve 812, 814. Release valve 812 is depicted as having an inlet 826 which receives pressurized fluid from the pump 816, a first outlet 824 which directs fluid toward the reservoir 804, and a second outlet 828 which directs the pressurized fluid toward the piston 802. Release valve 814 is similarly depicted as including inlet 820, reservoir outlet 822, and piston outlet 830. As was previously described, these release valves 812, 814 can be two-way valves. The release valves 812, 814 control whether the fluid from the pumps 816, 818 are directed toward the piston 802 resulting in the extension of the piston 802, or back toward the fluid reservoir 804. When the release valves 812, 814 are activated, the fluid within the piston 802 is permitted to leave the piston 802, to the release valves 812, 814, and to the reservoir 804. As the fluid leaves the piston, the pressure within the piston 802 reduces, and the piston retracts. Such action would result in the bed of a vehicle lowering, as was discussed with regard to FIGS. 1-3.

As is illustrated, a controller 806 is placed in electronic communication with the each of the pumps 816, 818, as well as each of the release valves 812, 814. In this manner, the controller can be utilized to control the pumps 816, 818, as well as the release valves 812, 814 in response to various sensor inputs e.g. a tilt sensor, bed position sensor, tailgate position sensor, as were previously described.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A tip-over prevention system for dumping vehicles, comprising:
   a tilt detector operably coupled to one of a cargo body and a chassis of a dumping vehicle, wherein at least a portion of the cargo body is configured to be raised by a piston, and wherein the tilt detector is configured to detect a current tilt;
   a fluid release valve placed in fluid communication with the piston;
   wherein the fluid release valve is activated in response to the tilt detector detecting a current tilt that exceeds a preset tilt limit, and wherein activation of the fluid release valve releases a pressure in the piston causing the cargo body of the vehicle to lower; and
   a tailgate position sensor configured to detect if a tailgate at the cargo body is in a closed position, wherein the fluid release valve is activated in response to the tailgate position sensor detecting a closed tailgate position and a cargo body position sensor detecting that the cargo body is in a raised position.

2. The system of claim 1, wherein the dumping vehicle further comprises one of a dump trailer and a dump truck, and wherein the piston further comprises one of a hydraulic piston and a pneumatic piston.

3. The system of claim 1, wherein the tilt detector is mounted to a rear cross-member of the chassis of the dumping vehicle.

4. The system of claim 1, wherein the tilt detector further comprises an inclinometer.

5. The system of claim 1, further comprising an alarm configured to be activated in response to the tilt detector detecting the current tilt exceeds the preset tilt limit.

6. The system of claim 1, wherein the piston further comprises a dual port piston having a first fluid port and a second fluid port, wherein the first fluid port is placed in fluid communication with the fluid release valve, and wherein the second fluid port is placed in fluid communication with a second fluid release valve.

7. The system of claim 6, further comprising a first fluid pump placed in fluid communication with the first fluid port, and a second fluid pump placed in fluid communication with the second fluid port.

8. A method for dumping vehicle tip-over prevention, comprising:
   providing a dumping vehicle including a chassis, a dump bed, and a tailgate operably coupled to the dump bed, wherein at least a portion of the dump bed is configured to be raised by a piston;
   determining a current tilt of at least one of the dump bed and the chassis of the dumping vehicle;
   automatically releasing a fluid pressure from the piston in response to determining the current tilt exceeds a preset tilt limit, wherein releasing the fluid pressure lowers the dump bed;
   determining a tailgate position;
   determining a dump bed position; and
   releasing a fluid pressure from the piston to lower the dump bed in response to determining a closed tailgate position and a raised dump bed position.

9. The method of claim 8, further comprising providing a fluid release valve placed in fluid communication with the piston, and wherein automatically releasing a fluid pressure from the piston further comprises activating the fluid release valve.

10. The method of claim 9, further comprising providing a tilt detector coupled to one of the dump bed and the chassis, and wherein determining the current tilt further comprises detecting the current tilt.

11. The method of claim 10, wherein the tilt detector comprises an inclinometer.

12. The method of claim 11, further comprising mounting the inclinometer to a rear cross-member of the chassis of the dumping vehicle.

13. The method of claim 8, further comprising triggering an alarm in response to determining that the current tilt exceeds the present tilt limit.

14. A tip-over prevention system for dumping vehicles, comprising:
   a tilt detector operably coupled to one of a cargo body and a chassis of a dumping vehicle, wherein the tilt detector is configured to detect a current tilt;
   wherein at least a portion of the cargo body is configured to be raised by a dual port piston, the dual port piston having a first fluid port and a second fluid port, wherein the first fluid port is placed in fluid communication with a fluid release valve, and wherein the second fluid port is placed in fluid communication with a second fluid release valve; and
   wherein the fluid release valve is activated in response to the tilt detector detecting a current tilt that exceeds a preset tilt limit, and wherein activation of the fluid release valve releases a pressure in the piston causing the cargo body of the vehicle to lower.

15. The system of claim 14, further comprising a first fluid pump placed in fluid communication with the first fluid port, and a second fluid pump placed in fluid communication with the second fluid port.

* * * * *